G. G. EARL.
METHOD OF HYDRAULICALLY CONTROLLING APPARATUS.
APPLICATION FILED NOV. 11, 1912.
1,174,243.
Patented Mar. 7, 1916.
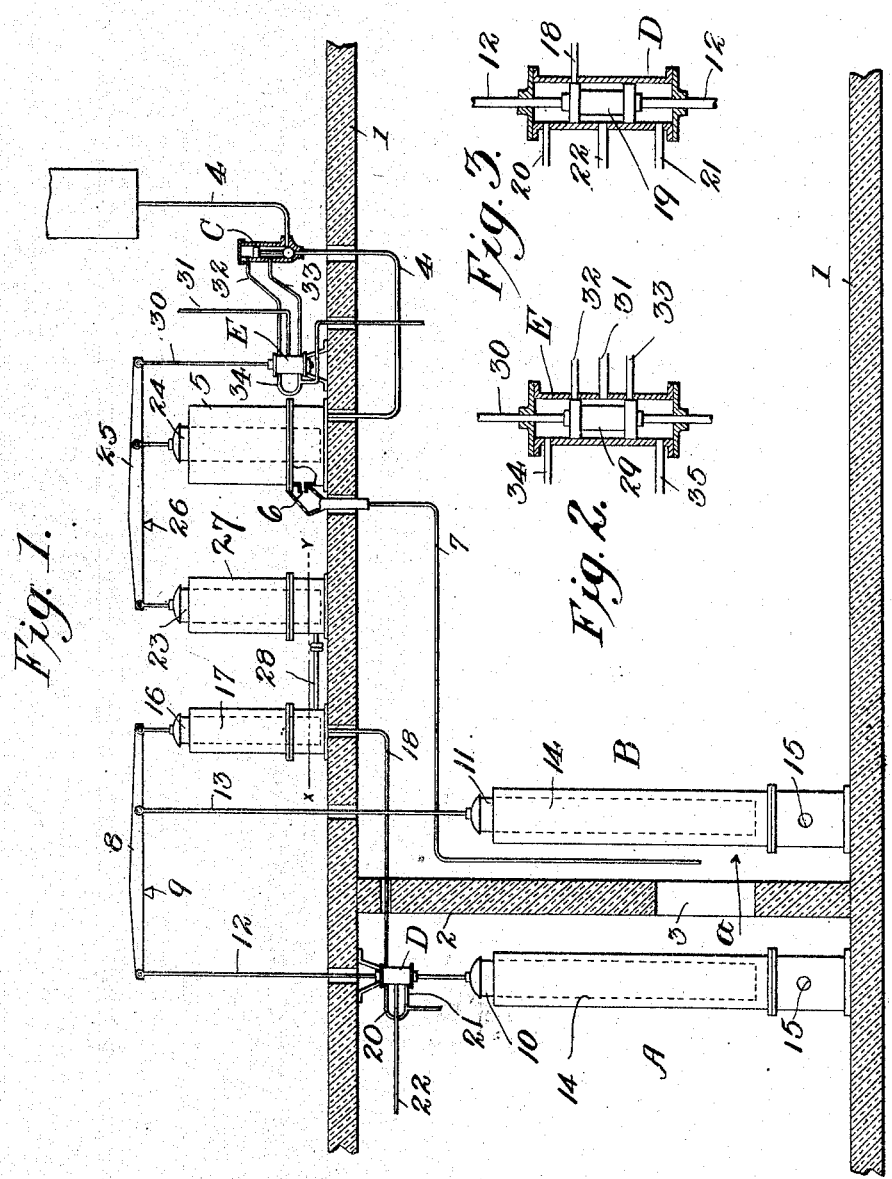

UNITED STATES PATENT OFFICE.

GEORGE GOODELL EARL, OF NEW ORLEANS, LOUISIANA.

METHOD OF HYDRAULICALLY CONTROLLING APPARATUS.

1,174,243.  Specification of Letters Patent.  Patented Mar. 7, 1916.

Original application filed January 3, 1910, Serial No. 536,239. Divided and this application filed November 11, 1912. Serial No. 730,671.

*To all whom it may concern:*

Be it known that I, GEORGE G. EARL, a citizen of the United States, residing at New Orleans, in the parish of Orleans and State of Louisiana, have invented certain new and useful Improvements in the Method of Hydraulically Controlling Apparatus; and I do hereby declare the following to be a full, clear, and exact description of my invention, such as will enable others skilled in the art to which it appertains to make and use the same.

This invention relates to a method or process employed in automatically controlling or actuating an independent mechanism, such, for example, as a recording or indicating device or a valve or set of valves for governing the head or the level of a liquid.

One of the fundamental principles of this invention consists in my discovery that many useful purposes in controlling the movement of a substance can be accomplished by an apparatus or device capable of automatically creating and maintaining a head, level or pressure over, on or against a fixed point, which will always be proportional or functional to another head, level or pressure, or to the difference between two or more heads, levels or pressures, one or more of which may be varying.

In the devices hereinafter illustrated, the pressures, or differences of pressures, which have been shown for utilization are, in some cases, the heads on two sides of an orifice. It is obvious, however, that the difference between any two other heads, levels or pressures which also varies functionally with a fluid flow in a conduit, could be used with equal facility with this device.

This application is a division of my application #536,239, filed Jan. 3, 1910.

Other objects of my invention and the invention itself will be best illustrated from a description of one form of apparatus in the operation of which the process or method is employed.

Figure 1 of the drawings is a diagrammatic view of an apparatus embodying my invention, said apparatus being used for automatically controlling the supply of a chemical solution to water which it is desired to treat with said solution. Fig. 2 is a detail vertical sectional view of the balanced pilot valve that controls the fluid which actuates the hydraulic valve arranged in the chemical solution supply pipe. Fig. 3 is a detail vertical sectional view of the balanced pilot valve that controls the admission and egress of water to and from the receptacle in which one of the weights is arranged.

Referring to Fig. 1 of the drawings, 1 designates the top and bottom walls of a conduit through which water flows, and 2 designates a vertically disposed partition that separates said conduit into two compartments A and B, said partition being provided with an orifice 3 that permits the water to flow from the compartment A into the compartment B, as indicated by the arrow *a*. The object of this apparatus is to control the introduction of a chemical solution into the water in the compartment B and cause the flow of said chemical solution to vary automatically as the flow of water into said compartment varies. The chemical solution is contained in a suitable tank, not shown, and is conducted from said tank by means of a pipe 4 to a tank 5 having an orifice 6 that permits the chemical solution to escape from said tank through a pipe 7 into the compartment B, a hydraulic valve C being arranged in the pipe 4 for controlling the flow of the chemical solution to the tank 5. While I have herein shown a hydraulic valve C for controlling the supply of chemical solution to the water conduit, it will, of course, be obvious that any other suitable type of valve could be used for this purpose and therefore, I do not wish it to be understood that my broad idea is limited to the exact construction herein shown.

A beam or lever 8, which oscillates on a fixed or stationary fulcrum 9, sustains two cylindrical-shaped weights 10 and 11 of equal length and diameter, said weights being supported by rods 12 and 13, respectively, that are pivotally connected to the beam 9 at equal distances from the fixed fulcrum of said beam. The weight 10 is arranged in the compartment A on one side of the orifice 3 and the weight 11 is arranged in the compartment B on the opposite side of said orifice, said weights being preferably arranged in such a manner that the lower ends of both weights will be approximately level with the lower edge of the orifice 3 when the beam 8 is in perfect balance. These weights preferably consist of closed cylinders loaded with some suitable heavy material which imparts enough weight to same to cause the cylinders to act as weights even though they are completely submerged by the water in the conduit. In other words, these cylinders 10 and 11 are weighted in excess of their displacement so that though they will be partially supported by its liquid, they will not float to the surface even when they are completely submerged. I prefer to arrange said weights inside of tubular-shaped protecting members 14 having openings 15 at their lower ends that permit the water in the conduit to flow into same and thus rise to the same height around the weights as the water on the outside of said protecting members, the function of these protecting members 14 being merely to prevent the flowing water in the conduit from exerting a lateral pressure on the weights or cylinders 10 and 11 or from surging around said weights and thus throwing them out of a true vertical position or causing them to oscillate more rapidly than does the mean level of the water around them.

A weight 16 which preferably consists of a closed cylinder weighted in excess of its displacement, is connected to one end of the beam 8, and said weight is arranged inside of a tank 17 to which water is supplied, as hereinafter described. This weight 16 is approximately one-half the length and area of the weights 10 and 11 but it is suspended from the beam 8 at twice the lever distance from the fulcrum of said beam as the weights 10 and 11. Consequently, a one-pound pull on weight 16 will balance a two-pound pull on weight 10 and will be equal to a two-pound pull on weight 11.

The cylinders or weights 10, 11 and 16 are connected to the beam 8 in such a manner that they will be in balance only when certain conditions are established; namely, when the water on both sides of the orifice 3 is at the same level and the water in the tank 17 is at a certain level; for example, the level indicated by the dot-and-dash lines $x$ and $y$ in Fig. 1. If the level of the water around the cylinder 10 varies, the sustaining force which said water exerts on said cylinder will, of course, change and thus throw the beam 8 out of balance. For example, if the flow of water into the conduit increases, the water in the compartment A will rise to a higher level than the water in the compartment B because the water has to pass through an orifice 3 of less diameter than the conduit, in passing from the compartment A into the compartment B, the partition 2 in the conduit forming practically a dam that holds back or impedes the flow of water. This difference in the level of the water on the two sides of the orifice 3 will throw the beam 8 out of balance for the weight 11 will exert a greater downward pull on the beam than the weight 10 does whenever the level of the water around the weight 11 is lower than the level of the water around the weight 10. It is immaterial, so far as the successful operation of my apparatus is concerned, whether the normal level of the water is at the lower ends of the weights 10 and 11 or at the middle or top of said weights, for so long as the level on both sides of the orifice 3 is equal, the water will not flow through said orifice and the beam and weights will remain in perfect balance. As soon as the water starts to flow through the orifice, however, the level of the water in the compartment A will rise and thus cause the weight 11 to descend and the weight 10 to move upwardly.

The destruction of the equilibrium of the weights and beam or the movement of said beam in either direction causes a force to be set in motion that will restore the equipoise of said beam and weights, and, in the embodiment of my invention herein shown, said force consists of a hydraulic medium that is admitted to or conducted away from the tank 17 by means of a pipe 18, said hydraulic medium being controlled or set in motion by means of a balanced pilot valve D. It will, of course, be obvious, however, that any other suitable device could be substituted for the balanced pilot valve D, and in other embodiments of my invention wherein a pneumatic or an electrical medium is employed for restoring the equip of the system, a suitable device for same, such, for example, as a pneumatic valve or an electric switch or contacts, will be substituted for the valve D herein shown. The piston 19 of the valve D is herein shown as being secured to the rod 12 which forms the connection between the weight 10 and the beam 8 but it will, of course, be obvious that a separate connection between said piston and the beam or one of the weights could be employed without departing from the spirit of my invention.

The casing or cylinder inside of which the piston 19 of the valve D is reciprocatingly mounted, is provided at its upper and lower ends with waste-pipes 20 and 21. The pipe 18 that leads from the lower end of the tank 17 is tapped into the casing of the pilot valve D adjacent the upper end thereof, and a pressure line 22 is tapped into the casing of said valve at approximately the center thereof, as shown in Fig. 3, the piston 19 being so arranged that the pipe 18 is closed when the weights and beam 8 are in balance. The upward movement of the weight 10, caused by the rising of the water around said weight, imparts an upward movement to the piston 19 of the pilot valve D and thus opens the pipe 18 so that the water from the pressure line 22 can flow through said pipe into the tank 17 inside of which the weight 16 is arranged. The water continues to flow into this tank 17 until the level around the weight 16 is as much above the normal level indicated by the dot-and-dash lines $x$ and $y$ as the level of the water about the weight 11 is lower than the level about the weight 10. In other words, the pilot valve D permits enough water to flow into the tank 17 to exert sufficient additional sustaining pressure on the weight 16 to equalize the upward pressure that was exerted on the weight 10 by the water rising around same. The introduction of the water from the pressure line 22 into the tank 17 thus causes the beam 8 to return to its normal balanced position, and as said beam moves back to its normal position the piston 19 of the pilot valve moves back to its normal position, thereby cutting off the flow of water from the pressure line into the pipe 18.

If the supply of water to the conduit should thereafter be diminished the level of the water in compartment A will drop and thus cause the weight 10 to descend. The downward movement of this weight 10 causes the piston 19 of the pilot valve D to move downwardly but said piston is so constructed that it does not permit the water from the pressure line to flow into the pipe 18 when it moves in this direction, the downward movement of said piston merely opening the pipe 18 so that the water from the tank 17 can drain out through said pipe into the cylinder of the pilot valve and thence escape through the waste-pipe 20 adjacent the upper end of said valve cylinder. The water continues to drain out of the tank 17 until the water level around the weight 16 has dropped or fallen to a point only as much above the normal level indicated by the dot-and-dash lines $x$ and $y$ as the difference between the level around the weight 10 and the level around weight 11. That is to say, if the difference of level around 10 and 11 decreases, the equilibrium of beam 8 will be destroyed and the piston of pilot valve D will be moved downwardly and in such a direction that the water in tank 17 can drain out of same. The draining of the tank 17 diminishes the sustaining force on the weight 16, thereby causing said weight to move downwardly gradually as the level around it falls, and thus causing the beam 8 to resume its balance and close the pilot valve D so as to prevent further draining of tank 17. The level in tank 17 will then stand as much above the dot-and-dash line $x$—$y$ as the level around 10 is higher than the level around 11. If desired, the mechanism for actuating the gate of the hydraulic valve C that controls the flow of the chemical solution through the pipe 4, could be operated by the beam 8 so as to cause the supply of chemical solution to vary as the quantity of water supplied to the compartment B varies, but in the form described, for reasons to be hereinafter stated, I use a separate set of weights 23 and 24 and a beam 25 for operating the piston of a balanced pilot valve E which controls the hydraulic medium that actuates the hydraulic valve C.

The beam 25 is mounted on a fixed fulcrum 26, and the weights 23 and 24 are connected to said beam at equal distances from the fulcrum thereof, said weights preferably consisting of closed cylinders of equal area that are weighted in excess of their displacement so that they will act as weights even when they are completely submerged. The weight 23 is arranged inside of a tank 27, and the weight 24 is arranged inside of the tank 5 which receives the chemical solution from the supply pipe 4, the tank 27 being in communication with the tank 17 by means of a pipe 28 so that water can enter the tank 27 and assume the same level as the water in the tank 17. The weights 23 and 24 are so arranged that they will be in balance only when the level of the water around weight 23 is the same as the level of the chemical solution around weight 24, the least change in level around said weights causing the beam 25 to move and thus vary the position of the piston of the pilot valve E. The gate of the hydraulic valve C is so arranged that when the beam 25 is in balance the quantity of chemical solution that leaves the tank 5 through the orifice 6 will be just the same as the quantity of chemical solution that enters said tank through the pipe 4. The balanced pilot valve E is of substantially the same construction as the pilot valve D previously described, and the piston 29 of said valve is secured to a rod 30 that is pivotally connected to one end of the beam 25. A pressure line 31 leads to the center of the cylinder or casing of the valve E and pipes 32 and 33 lead from said valve cylinder to the cylinder of the hydraulic valve C, the cylinder of the pilot valve E being provided with waste-pipes 34 and 35 that lead from the upper and lower ends thereof, respectively.

Whenever the level of the water around the weight 23 drops the beam 25 will move in a direction to impart an upward movement to the piston 29 of the balanced valve E and thus permit the water in the pressure line 31 to flow through the pipe 32 into the cylinder of the hydraulic valve C and thus partially close the gate of said valve so as to restrict the flow of the chemical solution through the pipe 4 into the tank 5. The partial closing of the hydraulic valve C of course reduces the supply of chemical solution to the tank 5, and when the level of the solution around the weight 24 has dropped to the level of the water around the weight 23 the beam 25 will return to its balanced position and in doing so will move the piston of the pilot valve E back to its normal position, the gate of the hydraulic valve remaining in the position to which it has been moved so as to restrict the flow through the pipe 4 sufficiently to keep the level around the weight 24 at the same level as the level around the weight 23. If the level around the weight 23 should rise, as for example, during the time when the water is being admitted from the pressure line 22 into the tank 17 to restore the beam 8 to its normal balanced position, the beam 25 which carries the weights 23 and 24, will be thrown out of balance and thus move the piston of the pilot valve E downwardly so that the water from the pressure line 31 can flow through the pipe 33 into the cylinder of the gate valve C and thus move the gate thereof in a direction to permit a greater quantity of chemical solution to flow into the tank 5 and thus restore the balance of the beam 25, the piston of the pilot valve E of course cutting off the flow of the water through the pipe 33 when the equilibrium of the beam 25 is again established.

As the level of the water around the weights 16 and 23 must always be the same, and as the level around weight 16 is always equal to the difference of level around the weights 10 and 11, it necessarily follows that the head of liquid over the orifice 6 in the chemical solution tank 5 will always vary proportionately with the head of water over the main orifice 3 in the water conduit. Consequently, the flow of the chemical solution through the orifice 6 will always be proportionate, within certain limits, with the flow of water from the compartment A into the compartment B.

While I have herein shown only one weight 23 in the tank 27 for controlling a single beam 25, it will, of course, be obvious that said tank could be made large enough to receive a number of weights, each of which could be used for operating a beam or lever that governs a device for controlling the flow of liquid through an independent pipe. In this way any desired number of orifices could be controlled and thus regulate a number of different streams of liquid.

I claim—

1. The method of controlling the movement of a substance hydraulically which consists in creating a head, level or pressure over, on or against a fixed point, creating a second head, level or pressure, automatically and functionally varying said first named head, level or pressure as said second head, level or pressure varies by means of freely movable mechanism adapted to transmit and oppose forces proportional to the pressures acting upon it, and opposed to one another through it for its required range of motion.

2. The method of controlling the flow of a substance which consists in creating a plurality of fluid pressures, heads or levels against a fixed point and of varying one of said heads, levels or pressures automatically and functionally as the resultant of said other heads, levels or pressures by means of freely movable mechanism exerting constant forces at constant pressures throughout its range of motion.

3. The method of controlling a fluid flow which consists of providing a fluid pressure against a fixed point and automatically maintaining the same functional to another fluid pressure which is varying by means of freely movable mechanism exerting constant forces at constant pressures throughout range of motion.

4. The method of controlling a fluid flow which consists in providing a fluid pressure against a fixed point and automatically maintaining it functional to the difference between two other fluid pressures, one of which is varying by means of freely movable mechanism exerting constant forces at constant pressures throughout its range of motion.

5. The method of controlling a fluid flow which consists in providing a fluid pressure against a fixed point and automatically maintaining it functional to the difference between two other fluid pressures both of which are varying by means of freely movable mechanism exerting constant forces at constant pressures throughout its range of motion.

6. The method of controlling a fluid flow, which consists of producing a fluid pressure difference against a fixed point and maintaining it functional to a varying fluid pressure by means of freely movable mechanism exerting constant forces at constant pressures throughout its range of motion.

7. The method of controlling a fluid flow which consists of providing a fluid pressure difference against a fixed point and automatically maintaining it functional to the resultant of a plurality of other pressure differences, one of which is variable by means of freely movable mechanism exerting constant forces at constant pressures throughout its range of motion.

8. The method of controlling a fluid flow which consists of providing a fluid pressure difference against a fixed point, and automatically maintaining it functional to the resultant of a plurality of other pressure differences, all of which are variable by means of freely movable mechanism exerting constant forces at constant pressures throughout its range of motion.

9. The method of creating a flow in a closed conduit under pressure functional to a pressure or pressure difference which is varying through the operation of a normally balanced vibratile member reciprocating through a very small distance and utilizing said flow to maintain said member in normal balanced position.

10. The method of creating a flow in a closed conduit under pressure functional to a pressure of pressure difference which is varying through the operation of a balanced vibratile member reciprocating through a very small distance and utilizing said flow to maintain said member in normal balanced position.

11. The method of actuating apparatus hydraulically by creating a pressure in a conduit, providing a vibratile balanced member adapted to reciprocate through small distances, creating a functional flow through the operation of said member through such distances, operating said apparatus by said flow and utilizing said flow to maintain said member in normal balanced position.

12. The method of operating apparatus hydraulically which consists in providing a balanced vibratile member reciprocating through a small distance to maintain its balance, through such member creating a functional flow in a closed conduit under pressure, controlling such apparatus through such functional flow and utilizing said flow to maintain said member in normal balanced position.

13. The method of controlling apparatus hydraulically which consists in providing a normally balanced member capable of being vibrated on excursions of small amplitude and of creating a functional flow through the operation of said member in such amplitudes, which flow operates said apparatus hydraulically and utilizing said flow to maintain said member in normal balanced position.

14. The method of regulating fluid pressure automatically, which consists in creating a varying governing fluid pressure, creating an independent fluid pressure, providing means through which said independent pressure is governed and regulated in any predetermined functional relation to said first named fluid pressure, said means including a balancing vibratile member acted upon by said pressures and maintained in equilibrium.

15. The method of regulating fluid pressure automatically, which consists in providing a varying governing fluid pressure difference, creating an independent fluid pressure, providing means through which said independent pressure is governed and regulated in any predetermined functional relation to said fluid pressure difference, said means including a balanced vibratile member acted upon by said pressure and pressure difference and maintained in equilibrium.

16. In a method the provision of a stationary fluid receptacle, creating fluid pressure therein, providing a second fluid receptacle and creating a fluid pressure therein and through vibratory means automatically causing changes in pressure in one of said receptacles functionally to changes in pressure in the other of said receptacles, said vibratory means being freely movable and exerting constant forces at constant pressures throughout the range of motion thereof.

17. In a method the provision of a plurality of stationary fluid receptacles, creating fluid pressures in each of said receptacles and through vibratory means automatically causing changes in pressure in one of said receptacles functionally to the resultant of the changes in pressure in the other of said receptacles, said vibratory means being freely movable and exerting constant forces at constant pressures throughout the range of motion thereof.

18. The method of maintaining any predetermined functional relation between a plurality of static fluid pressures measured from a fixed and common datum plane, and communicated from one or more sources of fluid pressure to a plurality of fluid pressure cells, which consists in providing such cells and in subjecting one or more of said cells to independently varying static fluid pressures and in providing a vibratile member adapted to be acted upon by the fluid pressure in all of said cells, and to be affected in its action thereon in a definite amount and direction by each changed condition of pressure in each of said respective static fluid pressure cells, and in equilibrium only when said predetermined functional relations exist, and in providing sources of fluid pressure of adequate high and low pressure range connected with one or more of said fluid pressure cells, and providing means including a valve operated by said vibratile member when its equilibrium is destroyed to cause compensating changes of pressure in the last named cells, and thereby restore the equilibrium of said vibratile member.

19. The method of maintaining a fluid pressure in one fluid pressure cell equal to another independently varying fluid pressure in another fluid pressure cell, both pressures being measured from a fixed and common datum plane, which consists in providing such fluid pressure cells and a source of pressure connected to one of said cells, creating therein an independently varying static fluid pressure, and a vibratile member acted upon oppositely by the pressures in said cells, and of providing a higher source of fluid pressure and an outlet for fluid flow of lower pressure than said independently varying static fluid pressure, with a fluid passage-way from said source to said outlet and a connection from said passage-way between said source and said outlet, to the other of said fluid pressure cells in which the pressure is to be governed, and prividing means including a valve operated by said vibratile member to regulate the quantity of fluid in said governed pressure cell.

20. The method of controlling apparatus hydraulically, which consists in creating a plurality of fluid pressures against a fixed point and by means of freely movable mechanism exerting constant forces at constant pressures throughout the necessary range of motion thereof, and of varying one of said pressures automatically and functionally as the resultant of the other of said pressures varies.

21. The method of automatically regulating one or more static fluid pressures in any predetermined functional relation with one or more other independently varying static fluid pressures, all of said pressures being measured from a fixed and common datum plane, which consists in providing a plurality of fluid pressure chambers, each adapted to receive fluctuating static fluid pressures, and of connecting said independently varying pressures each to one of said pressure chambers, and in providing a vibratile member adapted to move through a small but finite range of motion and a plurality of weights attached to such vibratile member and adapted to exert a thrust due to their weights upon said member tending to cause said member to move within said range of motion, said weights being affected in the amount of said thrust respectively by the fluctuating fluid levels in said static fluid pressure chambers, and in providing a source of fluid pressure and an outlet for fluid flow of adequate high and low pressure range and a passage-way from said source to said outlet with connection between said source and said outlet to one or more other of said fluid pressure chambers, and a valve in said passage-way to govern the flow of fluid therethrough operated by said vibratile member.

22. The method of maintaining the static fluid pressure in one fluid pressure cell in any predetermined functional relation to an independently varying static fluid pressure in another fluid pressure cell, both of said pressures being measured from a fixed and common datum plane, which consists in providing such cells and such independently varying fluid pressure connected to one of said cells, and a movable member acted upon by the pressure in said cells, and in providing a source of fluid pressure and an outlet for fluid flow of adequate high and low pressure range, and a fluid passage-way from said source to said outlet connected between said source and said outlet with the other of said cells, and providing a valve in such passage-way operated by said movable member to govern the flow of fluid through said passage-way.

23. The method of maintaining the static fluid pressure in one fluid pressure cell in any predetermined functional relation to an independently varying static fluid pressure in another fluid pressure cell, both of said pressures being measured from a fixed and common datum plane, which consists in providing such cells and such independently varying fluid pressure connected to one of said cells, and a vibratile member acted upon by two weights connected therewith, said weights being adapted to transmit varying thrusts to said vibratile member depending respectively upon the fluid levels existing in said static fluid pressure cells, and in providing a source of fluid pressure and an outlet for fluid flow of adequate high and low pressure range, and a fluid passage-way from said source to said outlet connected between said source and said outlet with the other of said cells, and providing means operated by the movable member to govern the flow of fluid in said passage-way.

24. The method of controlling a fluid pressure or pressure difference so that it shall vary functionally with another pressure or pressure difference, which consists in governing the flow of fluid supply which creates the said fluid pressure or pressure difference by the action of a movable member which is acted upon by said first named pressure or pressure difference and by said varying pressure or pressure difference and which member is in equilibrium only when the desired functional relations exist between the said first named fluid pressure or pressure difference and the said varying pressure or pressure difference.

25. The method of creating a fluid pressure in a pressure chamber in a fixed position, which shall vary functionally with variations occurring in another fluid pressure chamber in a fixed position, which consists in causing the first-named pressure and the second named pressure to act upon a movable member which movable member is in equilibrium when the required functional relations exist and acts whenever its equilibrium is destroyed by any change in the second named fluid pressure to bring about a corresponding change in the first named fluid pressure thereby restoring the required functional relation between the said first named and the said second named for the pressure.

26. The method of creating a fluid pressure which shall vary functionally with variations occurring in a pressure difference, which consists in causing the first named pressure and the pressure difference to act upon a movable member, which movable member is in equilibrium when the required functional relations exist, and acts when its equilibrium is destroyed by any change in the pressure difference to cause a corresponding change in the first named pressure thereby restoring the required functional relation between the first named pressure and the pressure difference.

27. The method of creating a pressure difference which shall vary functionally with variations occurring in a fluid pressure, which consists in causing the said pressure difference and the last named pressure to act upon a movable member, which movable member is in equilibrium when the required functional relation exists and acts whenever its equilibrium is destroyed by any change in the last named pressure to bring about a corresponding change in the fluid pressure difference, thereby restoring the required functional relation between the pressure difference and the last named fluid pressure.

28. The method of creating a pressure difference which shall vary functionally with variations occurring in a second fluid pressure difference, which consists in causing the first named pressure difference and the second named pressure difference to act upon a movable member, which member is in equilibrium when the required functional relations exist and acts whenever its equilibrium is destroyed by any change in the second named fluid pressure difference to bring about a corresponding change in the first named fluid pressure difference, thereby restoring the required functional relation between the said first named and said second named fluid pressure differences.

29. The method of causing the fluid pressure over a fixed datum to vary functionally with variations occurring in another varying fluid pressure which consists in causing both of said pressures to act upon a movable member, which movable member is in equilibrium when the required functional relations between said two pressures exists and when its equilibrium is destroyed by any change in the second named pressure will move and thereby modify said first named pressure to the required functional relation and thereby restore the equilibrium of said movable member.

30. The method of creating automatically any required functional relation between a plurality of fluid pressures acting at fixed points, one or more of which pressures is freely varying, which consists in applying said pressures to a movable member, which movable member is in equilibrium and at rest when the required functional relation exists and whenever such functional relation is destroyed moves to a new position of equilibrium and thereby acts upon one or more of said pressures to restore said required functional relations.

31. The method of creating any required functional relation between fluid pressures which constitute pressure differences effecting the discharge of fluids through two different discharging members in fixed positions, which consists in applying all of said pressures to a movable member, which movable member is at rest and in equilibrium when the required functional relation exists and whenever its equilibrium is destroyed moves to a new position of equilibrium and thereby restores the required functional relations.

32. The employment of a movable member acted upon by one or more fluid pressures, whose effective sum is varying to govern the effective sum of one or more other fluid pressures which also act upon said movable member so that the effective sum of said second named fluid pressures is automatically maintained at a predetermined function of the effective sum of said first named fluid pressures, all of said fluid pressures being referred to and measured from a common datum plane at a constant elevation.

33. The method of regulating fluid pressure automatically, which consists in utilizing a plurality of fluid pressures, one or more of which is varying, utilizing an independent fluid pressure, providing means through which said independent pressure is governed and regulated in any predetermined functional relation to the algebraic sum of the other fluid pressures, said means including a balanced vibratile member acted upon by all of said pressures and maintained in equilibrium.

34. The method of regulating fluid pressure automatically, which consists in creating a varying governing fluid pressure, creating an independent fluid pressure difference and providing means through which said independent pressure difference is governed and regulated in any predetermined functional relation to said fluid pressure, said means including a balanced vibratile member acted upon by said pressure difference and said pressure and maintained in equilibrium.

35. The method of regulating fluid pressure automatically, which consists in utilizing a varying governing fluid pressure difference. utilizing an independent fluid pressure difference and providing means through which said independent pressure difference is governed and regulated in any predetermined functional relation to said first named pressure difference, said means including a balanced vibratile member acted upon by said fluid pressure differences and maintained in equilibrium.

36. The method of regulating fluid pressure automatically, which consists in utilizing a plurality of governing fluid pressures, one or more of which are varying, utilizing an independent fluid pressure difference and providing means through which said independent pressure difference is governed and regulated in any predetermined functional relation to the varying algebraic sum of said plurality of other fluid pressures, said last named means including a balanced vibratile member acted upon by said fluid pressure difference and said plurality of fluid pressures and maintained in equilibrium.

In testimony whereof, I affix my signature in the presence of two witnesses.

GEORGE GOODELL EARL.

Witnesses:
EDWARD A. FOWLER,
JOHN C. BARTLEY.